United States Patent [19]

Neace

[11] Patent Number: 4,595,529

[45] Date of Patent: Jun. 17, 1986

[54] SOLVENT WASH SOLUTION

[75] Inventor: James C. Neace, Blackville, S.C.

[73] Assignee: The United States of America as represented by the Department of Energy, Washington, D.C.

[21] Appl. No.: 589,241

[22] Filed: Mar. 13, 1984

[51] Int. Cl.[4] ........................ G21F 9/04; B01D 11/00; B01D 11/04

[52] U.S. Cl. .................................... 252/631; 210/682; 252/627; 423/8; 423/10

[58] Field of Search ........................ 252/631, 626, 627; 210/682, 688, 639, 681; 423/8, 10, 11, 2, 3

[56] References Cited

U.S. PATENT DOCUMENTS

| | | | |
|---|---|---|---|
| 2,990,240 | 6/1961 | Ellison et al. | 23/14.5 |
| 3,987,145 | 10/1976 | Bruns et al. | 252/631 |
| 4,059,461 | 11/1977 | Schmieder et al. | 423/10 |
| 4,180,476 | 12/1979 | Anav et al. | 252/631 |
| 4,265,861 | 5/1981 | Cleary et al. | 252/631 |
| 4,404,130 | 9/1983 | Fitoussi et al. | 252/631 |

FOREIGN PATENT DOCUMENTS

| | | | |
|---|---|---|---|
| 0036359 | 9/1981 | European Pat. Off. | 252/631 |

OTHER PUBLICATIONS

McKibben, J. 1983, Chemistry of the Purex Process, Report #DPSPU-83-172-1, American Chemical Society.

*Primary Examiner*—Stephen J. Lechert, Jr.
*Assistant Examiner*—Howard J. Locker
*Attorney, Agent, or Firm*—Allen F. Westerdahl; Judson R. Hightower

[57] ABSTRACT

Process for removing diluent degradation products from a solvent extraction solution, which has been used to recover uranium and plutonium from spent nuclear fuel. A wash solution and the solvent extraction solution are combined. The wash solution contains (a) water and (b) up to about, and including, 50 volume percent of at least one-polar water-miscible organic solvent based on the total volume of the water and the highly-polar organic solvent. The wash solution also preferably contains at least one inorganic salt. The diluent degradation products dissolve in the highly-polar organic solvent and the organic solvent extraction solvent do not dissolve in the highly-polar organic solvent. The highly-polar organic solvent and the extraction solvent are separated.

14 Claims, No Drawings

SOLVENT WASH SOLUTION

BACKGROUND OF THE INVENTION

FIELD OF THE INVENTION AND CONTRACT STATEMENT

The U.S. Government has rights in this invention pursuant to Contract No. DE-AC09-83SR11036 between the U.S. Department of Energy and the Allied - General Nuclear Services.

The invention relates to wash solutions for removing impurities from solvent extraction solutions.

DISCUSSION OF BACKGROUND AND PRIOR ART

For thirty years the Purex process has been the primary method for the recovery of uranium and plutonium from spent nuclear fuel. Despite world-wide use during such time, no practical method has yet been demonstrated for the removal of diluent degradation products. As a consequence, all of the existing Purex facilities constantly encounter problems in emulsification, improper phase disengagements and highly radioactive solvents.

The name "Purex" was derived from Plutonium Uranium Recovery by EXtraction. The preferred extractant is tri-n-butyl phosphate (TBP), which has good radiolytic and chemical stability, and low aqueous solubility. The chelating properties of TBP make it possible not only to efficiently eliminate the undesired fission products and other actinide byproducts, but also to cleanly separate the two desired products, namely, uranium and plutonium, from each other. However, the density of TBP (0.98) is so close to water that dilution in a non-polar low-density organic liquid is necessary to achieve adequate phase separation. Therefore, the Purex process is generally defined as a counter-current solvent extraction process in which a solution of tri-n-butyl phosphate in a non-polar organic diluent is used to recover and purify plutonium and uranium from dissolved, irradiated nuclear fuels or targets. The process has many variations. The percentage of TBP in the solution has been varied in different applications from 3.5 to 50 volume percent, with 30 volume percent being most common. Several diluents have been used, including refined kerosenes and carbon tetrachloride, with the current diluent of choice being n-paraffin oil (for example, predominately n-tridecane). The Purex process has been used to process fuels and targets varying in $^{235}U$ enrichment from 0.2 to over 93 percent, to process highly irradiated plutonium, recovering not only the plutonium, but also a mixture of actinides of higher atomic numbers, to separate and purify neptunium-237 byproduct, and to recover $^{233}U$ and thorium from irradiated thorium targets.

Typical feed for the Purex process contains uranyl nitrate, nitric acid, plutonium(IV) nitrate, fission products and small concentrations of actinide byproducts. The first cycle of solvent extraction provides the initial decontamination from fission products and, in most cases, the separation of plutonium and uranium. In the first bank of the separators, the plutonium and uranium are extracted into the extraction solution as $Pu(NO_3)_4(TBP)_2$ and $UO_2(NO_3)_2(TBP)_2$. Neptunium byproduct can be rejected to the aqueous waste stream, if that is desired, by feeding a small stream of nitrous acid or nitrite salt solution into the bank to keep the neptunium in the inextractable Np(V) valence. It is also possible to reject the plutonium to aqueous stream as Pu(III) while extracting Np(IV) as $Np(NO_3)_4(TBP)_2$ by adding a suitable reductant, such as ferrous sulfamate, to the aqueous scrub stream and/or feed. The extraction solution from the first bank contains the desired products and becomes the feed for the second bank. In the second bank of separators, the uranium-plutonium separation is accomplished by reducing plutonium to the relatively inextractable Pu(III) valence, thus stripping it from the extraction solution into the aqueous stream. In the third bank of the first cycle, the uranium is stripped from the extraction solution into a low acid stream.

Four streams exit the first cycle, namely: (1) the spent extraction solution, which is washed and recycled; (2) the aqueous waste; (3) the aqueous uranium product stream, which is concentrated and then processed through a second cycle of solvent extraction for additional decontamination from plutonium and fission products; and (4) the aqueous plutonium product stream, which is processed through a second cycle of solvent extraction for additional fission product decontamination. Typically the plutonium in the fourth exit stream normally contains less than 50 parts of uranium per million parts of plutonium, and the second plutonium cycle provides no uranium decontamination. The uranium in the third exit stream normally contains less than 10 parts of plutonium per billion parts of uranium, but the second uranium cycle has the routine capability of rejecting plutonium to the aqueous waste stream by reducing plutonium in the second cycle feed to Pu(III) with ferrous sulfamate. The only fission products that are sufficiently extractable to become significant contaminants in product streams are $^{95}Zr$, $^{103}Ru$ and $^{106}Ru$.

The fission product $^{131}I$ (8.04d half life) is sufficiently volatile so that precautions must be taken to prevent undesirable releases of it to the atmosphere. The problem of volatile radioiodine can be dealt with by cooling the fuel long enough for it to decay to insignificant levels or by trapping the iodine on any of a number of silver zeolites.

The diluent normally used in the Purex process is a n-paraffin hydrocarbon. Also continuous extraction solution wash of alternating carbonate (or caustic) and nitric acid are generally used today for extraction solution recycle. There is still the problem of providing degradation-purification balance in the extraction solution such that the extraction solution quality is at an acceptable steady-state, with regards to product losses, fission product decontamination, stage efficiencies, Pu-U separations, washed solvent activity levels and interfacila "crud" levels. Therefore, it is no longer necessary to periodically to replace the entire process extraction solution inventory to maintain acceptable plant performance.

The specific chemicals, that is, extraction solution degradation products (i.e., products resulting from degradation of the extractant and degradation of the diluent which together make up the extraction solution), that are causing the problems have not yet been definitively defined. Some experiments and analytical investiations have identified certain types of chemicals in degraded extraction solution, namely, nitrate esters, nitroalkanes, organic phosphate polymers, dibutyl prosphoric acid, butanol, carboxylic acids, nitroso compounds, alkenes and carboxylic acid polymers. But most of such work was done in kerosene-type diluent, rather than n-paraffin, and the experiments rarely simulated actual steady-state plant conditions with its repetitive cycles of extraction solution irradiation and extraction solution washing. The strong ligands, whatever they are, that tightly bind ruthenium, zirconium and plutonium, in the extraction solution, have little or no adverse effect on plant operation. The types of chemicals that do affect plant performance are: (a) weak ligands that extract fission products or other undesired elements into the extraction solution in the more acidic extraction sections of the banks, and then release them into the aqueous phase along with the products in the lower acid stripping section, and (b) any chemicals that reduce the surface tension between the extraction solution and aqueous phases thus reducing coalescence rate causing stage-efficiency changes which can have very significant effects on process performance.

In judging extraction solution purification techniques, ligand removal from the extraction solution is the criterion which should be used to determine the success or failure of the method. Radioactivity removal is not a valid criterion. It is the ligand that must be removed and it is possible to remove radioactivity without removing the ligand.

Techniques that have been investigated in the past to improve extraction solution purification have fallen into four general categories:

(1) Aqueous washes, including a variety of acids and bases, reductants and oxidants and some complexants for removal of specific radionuclides.

(2) Inorganic sorbants, including activated charcoal, activated $MnO_2$, silica gel, proprietary aluminium silicates and natural ores.

(3) Organic ion exchange, cation and anion, macroporous and gel types.

(4) Distillation, including flash and vacuum techniques.

U.S. Pat. No. 2,990,240 disclosed the basic Purex process for the recovery of uranium and plutonium from spent nuclear fuel. Patent '240 and the basic Purex process involve a process for segregating and separately recovering uranium values, from an initial aqueous solution containing the same together with plutonium and fission product values. The initial solution is intimately contacted, while maintaining a substantial concentration of nitric acid in the solution, with an organic extractant. The organic extract contains a minor volumetric proportion of a substantially water-immiscible liquid tri-alkyl phosphate dissolved in a major volumetric proportion of a substantially water-immiscible, liquid, non-polar, saturated organic solvent. The relative amounts of tri-alkyl phosphate and uranium values in the solutions in contact are controlled to achieve a concentration of uranium values in the organic extractant of at least 0.35 mole of uranium per mole of tri-alkyl phosphate. Thereby uranium values are preferentially extracted into the organic phase. The resulting uranium bearing organic extract is separated from the remaining plutonium-containing and fission-product-containing aqueous raffinate. Thereupon, the separated uranium-bearing organic extract is intimately contacted with water, thereby stripping uranium values therefrom. Thereafter the resulting stripped-uranium-containing aqueous phase is separated from the spent organic extractant. The problem is to remove the impurities from the spent organic extractant, which normally still contains radioactive materials.

U.S. Pat. No. 4,059,671 teaches a method for increasing the lifetime of an extraction medium which contains an organophosphorous acid ester and a hydrocarbon, and which is used for reprocessing spent nuclear fuel and/or breeder materials. The extraction medium impurities resulting from chemical and/or radiolytic decomposition and complex compounds of such impurities with radionuclides are removed by washing the extraction medium with an aqueous hydrazine hydrate wash solution. The used extraction medium is brought into intimate contact with an aqueous hydrazine hydrate wash solution having a concentration of between about 0.1 and 1.0 molar, at a temperature between about 20° to about 75° C. Then the aqueous hydrazine hydrate wash solution is separated from the extraction medium.

U.S. Pat. No. 4,404,130 discloses a process for the plutonium decontamination of an organic solvent useful in the reprocessing of irradiated nuclear fuel. The process includes adding a reducing agent to the organic solvent. The reducing agent is soluble in the organic solvent and is a dialkyl dithiophosphoric acid. The organic solvent containing the reducing agent is brought into contact with an acid aqueous solution. The aqueous solution containing the plutonium is separated from the decontaminated organic solvent.

The extraction solution used in nuclear fuels reprocessing plants is normally regenerated with wash solutions containing alkali, such as, sodium carbonate or sodium hydroxide. While these wash solutions do remove the bulk of the impurities, they do not remove diluent degradation products which result in the generation of surfactants and complexants for fission products. Eventually such impurities build up in the extraction solution and render the material unsuitable for its intended use. The extraction solution is then disposed of, usually by burning. Such disposal requires specialized equipment to prevent toxic emmissions to the atmosphere.

SUMMARY OF THE INVENTION

An object of the invention is to provide a wash solution for removing impurities from solvent extraction solutions. Another object of the invention is to provide a wash solution for removing diluent degradation products from the solvent extraction solution used in the Purex process for recovering uranium and plutonium from spent nuclear fuel. A further object of the invention is to provide a process using such wash solution to remove such diluent degradation products from such solvent extraction solution. Other objects and advantages of the invention are set out herein or are obvious herefrom to one ordinarily skilled in the art.

The objects and advantages of this invention are achieved by the improved wash solution and method of the invention.

Optimum performance of the Purex process is dependent upon the prompt removal of degradation products introduced through chemical and radiation-induced attack upon the extraction solution. Currently used extraction solution cleanup procedures are satisfactory for removal of dibutyl phosphate and monobutyl phosphate, but except for some of the more polar carbonyl compunds, such washes are ineffective against diluent degradation products. These unwanted byproducts of the Purex process, therefore, accumulate in the extraction solution and through interactions with each other, with alkaline wash solutions, and with tributyl phosphate and its decomposition products form a whole spectrum of surfactants and complexants which interfere in various ways with the Purex process.

To achieve the foregoing and other objects and in accordance with the purpose of the invention, as embodied and broadly described herein, the invention process involves removing diluent degradation products from a solvent extraction solution, which has been used to recover uranium and plutonium from spent nuclear fuel. A wash solution is combined with the solvent extraction solution. The wash solution contains: (a) water, and (b) up to about, and including, 50 volume percent of at least one highly-polar water-miscible organic solvent, based on the total volume of the water and the highly-polar organic solvent. The diluent degradation products dissolve in the highly-polar organic solvent and the extraction solvent does not dissolve in the highly-polar organic solvent. The highly-polar organic solvent and said extraction solvent are separated.

Suitable highly-polar organic solvents include ethanol and methanol; however, methanol is preferred. Preferably the highly-polar organic solvent is separated from the extraction solvent by decanting off the highly-polar organic solvent. The combining step is best conducted at a temperature above room temperature and preferably is conducted at a temperature between 55° and 65° C. Preferably the combination is done continuously and in counterflow, although any suitable means can be used to combine them. Preferably up to about 40 volume percent of the methanol, based on the total volume of the water and the methanol, is present in the wash solution.

Most preferably the wash solution also contains at least one inorganic salt. Preferably the inorganic salt is $Na_2CO_3$. Preferably up to about 0.5M of said inorganic salt, based on said water, is present. Preferably the purified solvent extraction solution is returned to be reused in circulation.

The wash solution contains only water and highly polar organic solvent, or water, highly polar organic solvent and at least one inorganic salt. The invention wash solution strips impurities, which are not removed by the usual wash solutions used in the industry, from the solvent extraction solution to the alcoholic (methanol) aqueous phase. The invention process increases the lifetime of the solvent extraction solution. The invention also removes impurities resulting from chemical and/or radiolytic decomposition and interfering compounds of such impurities with radionuclides from the solvent extraction solution.

The process of the invention avoids the requirements for disposal (possessed by the prior art processes) and offers a means to purify the extraction solution. The invention process also significantly reduces the radioactivity fixed in the extraction solution and thus reduces radiation exposure to personnel in areas of the plant where the material is contained. The recovered radioactive materials are also valuable.

The invention also includes a wash solution for removing diluent degradation products from a solvent extraction solution, which has been used to recover uranium and plutonium from spent nuclear fuel. The wash solution includes: (a) water; (b) up to about, and including, 50 volume percent of at least one highly-polar water-miscible organic solvent based on the total volume of the water and the highly-polar organic solvent; and (c) at least one inorganic salt.

Typically the highly-polar organic solvent is ethanol. The highly-polar organic solvent preferably is methanol. Most preferably the inorganic salt is $Na_2CO_3$. Preferably up to about 0.5M of said inorganic salt, based on the water, is present in the wash solution. Also preferably up to about 40 volume percent of the methanol (highly-polar organic solvent), based on the total volume of the water and the methanol, is present in the wash solutuon.

The wash solution of the invention solves the above-mentioned prior art problems by removing the unwanted by-products in the Purex solvent extraction solutions by a simple contact wash method. An important improvement over all existing Purex solvent wash solutions is obtained by the inclusion of methanol or other highly-polar organic solvent in common wash formulations. The new wash dissolves the diluent degradation products and a yellow pigmentation as well as radionuclides, all of which are essentially nonremovable by currently used wash solutions. Thus, there is a cleanup of the Purex extraction solution. The principal drawback to the use of the invention wash solution is the low flash point (60° C.) of methanol and the hazardous methanol vapors. These disadvantages can readily be overcome with properly designed facilities. Methanol is used commercially on a large scale and is safe if proper precautions are taken.

While not limiting the scope of the invention thereto, the theory behind the invention is that the contaminants are more polar than the solvent and, thus, are susceptible to removal by a water-miscible polar organic compound, preferably methanol, provided the polar solvent is first "diluted down" with water so that the tributyl phosphate (TBP) will not also be dissolved. This "cross-over point" appears to be around 50 volume percent of methanol. The effectiveness of the invention wash solution is further enhanced by the inclusion therein of inorganic salts, preferably $Na_2CO_3$. An additional improvement can be obtained by operation at an elevated temperature, preferably 60° C.

Reference will now be made in detail to the present preferred embodiment of the invention which are illustrated in the examples.

DETAILED DESCRIPTION OF THE INVENTION

All parts, percentages, ratios and proportions are on a weight basis unless otherwise stated herein or obvious herefrom to one ordinarily skilled in the art.

The pertinent portions of U.S. Pat. No. 2,990,240 (Patent '240) are incorporated herein by reference. Patent '240 discloses the basic Purex process for the recovery of uranium and plutonium from spent nuclear fuel. Patent '240 and the basic Purex process involve a process for segregating and separately recovering uranium values, from an initial aqueous solution containing the same together with plutonium and fission product values. The initial solution is intimately contacted, while maintaining a substantial concentration of nitric acid in the solution, with an organic extractant. The organic extract contains a minor volumetric proportion of a substantially water-immiscible liquid tri-alkyl phosphate dissolved in a major volumetric proportion of a substantially water-immiscible, liquid, non-polar, saturated organic diluent liquid. The relative amounts of tri-alkyl phosphate and uranium values in the solutions in contact are controlled to achieve a concentration of uranium values in the organic extractant of at least 0.35 mole of uranium per mole of tri-alkyl phosphate. Thereby uranium values are preferentially extracted into the organic phase. The resulting uranium bearing organic extract is separted from the remaining plutonium containing, and fission-product-containing aqueous raffinate. Thereupon the separated uranium-bearing organic extract is intimately contacted with water, thereby stripping uranium values therefrom. Thereafter the resulting stripped-uranium-containing aqueous phase is separated from the spent organic extractant. The problem is to remove the impurities from the spent organic extractant, which usually still contains radioactive materials.

The Purex process has been used to remove other radioactive materials besides uranium.

As used herein, the organic extract (spent or unspent) of the Purex process is usually termed a solvent extraction solution.

In processing spent nuclear fuels and/or breeder materials, the burnt up fuel elements are treated for the recovery of uranium, in reactors where plutonium is also formed, for the recovery of plutonium, and in reactors where breeder material is also formed for the recovery of breeder material. As a rule, the recovery is carried out by dissolving the fuel elements, usually in nitric acid, to form an aqueous solution containing uranium, plutonium, fission products and/or breeder materials. The uranium and/or plutonium are then extracted from the aqueous solution by bringing the aqueous solution into contact with an organic solvent. During this extraction, the fission products remain in the aqueous solution. The extractant used to achieve the extraction is generally present in a solvent extraction solution where it is in admixture with a diluent. After the extraction into the organic extraction solution, the plutonium can be stripped from the organic extract into an aqueous solution and then the uranium can be stripped from the organic extract into an aqueous solution. Upon removal of the plutonium and uranium from the organic extract, the solvent extraction solution can be recycled and reused in the process system.

The substantially water-immiscible liquid trialkyl phosphates useful in the solvent extraction solution of the Purex process should be a liquid at room temperature, and should preferably comprise at least twelve carbon atoms among its alkyl radicals to provide adequate water immiscibility. Each alkyl radical usually has 3 to 8 carbon atoms. Among the variety of suitable members of this class, tri-n-butyl phosphate has proven particularly efficacious. Extractant dilutions within the approximate volumetric range of 5 to 50 volume percent of tributyl phosphate in the solvent are suitable. Above 30 volume percent of tributyl phosphate, however, an adverse tendency of the extractant to form stable emulsions is occasionally encountered. 15 volume percent of tributyl phosphate dissolved in 85 volume percent of hydrocarbon has given eminently satisfactory results, especially since the important extractant relative-saturation of more than 70 weight percent in uranium is then more easily obtained at the aqueous uranium concentrations normally encountered, and since the distribution coefficients of uranium in stripping advantageously become considerably less than 1 upon employing dilutions below about 20 volume percent of tributyl phosphate.

The trialkyl phosphate or organophosphorous acid ester serves as the active solvent extractant in the solvent extraction solution.

Upon usage in the Purex process, some of the tributyl phosphate disintegrates to dibutyl phosphate and monobutyl phosphate, which are contaminants. The presence of monobutyl and dibutyl phosphates, impurities often found in tributyl phosphate, should be avoided; even small amounts deleteriously tend to draw and bind the plutonium and fission products exceptionally strongly into the extractant solution, and also disadvantageously tend to hold large portions of the extracted uranium in an unstrippable form in the extract.

Examples of the substantially water-immiscible, nonpolar, liquid, saturated, organic liquids of density different from that of water, useful as diluents in the solvent extraction solution of the Purex process are carbon tetrachloride, methyl cyclohexane and benzene, and particularly preferred is a substantially water-immiscible paraffinic hydrocarbon which is liquid at room temperature and desirably has a density within the range of about 0.6 to 0.9 $gm./cm.^3$ and a viscosity at least as low as water. Alkane homologues ranging from hexane, heptane and octane, on up through tetradecane, especially the normal isomers, are well suited. Mixtures of hydrocarbons are not objectionable; use of petroleum cuts in the gasoline-kerosene range is convenient and economical. Particularly preferred are petroleum naphthas having a density of about 0.75 g./cc., boiling range of 300° to 400° F., or somewhat lower, and a flash point of about 120° F., these are sold under such trade names as "Amsco 123-15," "Gulf BT," "Varsol," "Esso 107," "Shell HFMS," "DeoBase," and others. A typical composition of such naphthas is about 60 percent of paraffins, 30 percent of naphthenes and 10 percent of aromatics. Usually the organic solvent is less nocuous than the trialkyl phosphate.

The n-paraffin hydrocarbon serves as a diluent for the solvent in the extractant extraction solution.

During contact of the solvent extraction solution with the aqueous, nitric acid solution which contains heavily radioactive fission products and nuclear fuel and/or breeder materials, radiolytic and chemical reactions occur which produce undesirable decomposition products in the solvent extractant medium which unfavorably influence the function of the extraction process. Among other things, these decomposition products form strong complexes with plutonium, which complexes strongly favor the organic phase over an aqueous phase. As a result, these complexes cannot be removed from the organic phase into an aqueous stripping phase so that the plutonium remains in the organic phase and losses of valuable plutonium to the organic phase result. Typical decomposition products which are formed and which give rise to such complexes are dibutyl phosphate and monobutyl phosphate. Further, the pronounced complexing properties of the decomposition products bring about an increased, disturbing extraction of fission products, such as zirconium-95, from the starting aqueous nitric acid phase into the organic phase loaded with uranium, plutonium and other actinides. Moreover, an increase in fission product concentration of the organic phase reduces the extraction efficiency for the actinides, the separation efficiencies both of the actinides from the fission products and the actinides from each other, and the degree of purity of the individual actinides. Fission products also enhance the radiolytic processes in the organic phase and, aggravate phase separation by generating turbidities and colloids in the interface between the organic and aqueous phases. Thus, the increased extraction of fission products into the organic extractant solution causes decontamination factors which are less than adequate and a poor separation of the organic phase from the aqueous phase.

Also, the decomposition products which accumulate in the solvent extraction solution limit the useful lifetime of a solvent extraction solution charge. Then, the spent solvent extraction solution charge must be replaced by a fresh one. To overcome these problems, attempts have been made to satisfactorily purify the solvent extraction solution charges after use to increase their lifetime and considerably reduce operating costs.

It is necessary to provide a method and wash solution which removes such decomposition products and other impurities before the solvent extraction solution is reused or recycled.

Presently used wash solutions contain only inorganic salts, such as, sodium carbonate, with or without admixture therein of sodium hydroxide. Such washes remove only part of the impurities present in Purex solvents, generally only the hydrolysis products of tributyl phosphate. In the invention, a highly-polar water-miscible organic solvent, preferably methanol, is combined with an aqueous solution of inorganic salts to form a contact wash solution for removing impurities present in Purex solvents, normally 30 volume percent of tributyl phosphate in a normal paraffin hydrocarbon diluent. Preferably methanol, but also any other polar organic solvent miscible with water such as ethanol, is combined with water, which or may may not be combined with sodium carbonate or other inorganic salts, to form a wash solution of such polarity and chemical composition that impurities, including yellow color bodies, in a solvent are dissolved while the solvent, consisting of tributyl phosphate in a paraffin hydrocarbon diluent, is not dissolved and can be decanted off in a purified form.

The prior art washes remove the tributyl phosphate degradation products, namely, dibutyl phosphate (DBP) and monobutyl phosphate (MBP), but they do not remove the diluent degradation products. The deleterious degradation products in radioactive solvent extraction solution are produced mainly through radiation-induced free-radical mechanisms, while those in non-radioactive solvent extraction solution are caused mainly by oxidation from heat and nitric acid. When a highly-degraded solvent extraction solution is stirred for a few seconds with an equal volume of 100 percent methanol (a highly polar compound), a water-white layer of essentially pure diluent (a nonpolar compound) is formed on top as the light phase. The heavy phase contains all of the methanol, all of the tributyl phosphate (a somewhat polar compound), all of the solvent degradation products and all of the yellow color bodies. The disadvantage, under the circumstances, is that there is a total loss of tributyl phosphate. When this same procedure is repeated with pure water as the heavy phase, nothing happens. The degraded solvent extraction solution remains unchanged, as the light phase. On the basis that the diluent degradation products are more polar than tributyl phosphate, an optimum concentration of methanol in water is obtained which holds the diluent degradation products and yellow color bodies in the heavy phase while allowing the tributyl phosphate extractant to join the n-paraffin hydrocarbon diluent to form a new light phase. Excellent removal of the diluent degradation products, without any significant loss of tributyl phosphate, occurs when an aqueous wash solution containing up to 50 volume percent of methanol is used. The invention method is further improved by the inclusion of sodium carbonate in the water to form a methanol-carbonate wash solution. This added carbonate solution aids phase separation at low methanol concentration and also promotes removal of certain of the diluent degradation products.

The inorganic salt is usually a soluble alkali salt, sodium phosphate, sodium sulphate, sodium nitrate and sodium carbonate (preferred). Preferably from 0.01M to 0.4M of the inorganic salt or salts are present in the invention wash solution.

The invention has application in the regeneration of spent extractant solution used in nuclear fuels reprocessing plants. The invention also have application to other industries where extractants are used, such as, the mining and milling of ores. Or, in other words, the invention wash solution can be used throughout the nuclear and related industries, such as ore processing, where chemical separations with organic extraction solutions are used. The invention wash solution is of particular interest to Purex facilities since it offers a practical solution to a problem that is recognized worldwide today as having no practical solution. The invention process can be of use throughout the nuclear industry wherever chemical separations with organic extraction solution are used.

The following examples are given by way of illustration to further explain the principles of the invention. These examples are merely illustrative and are not to be understood as limiting the scope and underlying principles of the invention in any way.

EXAMPLE 1

A radioactive first cycle extraction solution from hot operation (radioactive) in a typical Purex facility, precleaned by prior art methods, was shaken in a separatory funnel at a temperature of 60° C., with an equal volume of 70 volume percent of methanol in 30 volume percent of water (only). (The first cycle extraction solution contained 30 volume percent of tributyl phosphate in a n-paraffin hydrocarbon diluent.) This one contact removed 62.12 percent of the total gamma radioactivity from the extraction solution. By comparison, five similar contacts with typical carbonate wash solutions now in use removed only 4.5 percent of the total gamma radioactivity. The typical wash solution used was 0.25M $Na_2CO_3$ in water.

EXAMPLE 2

A non-radioactive first cycle extraction solution from cold operation (non-radioactive) in a typical Purex facility was washed on a minature pulse column with 30 volume percent of methanol in 0.01M $Na_2CO_3$ by the usual procedure for Purex extraction solution cleanup using typical carbonate wash solutions. [The first cycle extraction solution contained 30 volume percent of tributyl phosphate in a n-paraffin hydrocarbon diluent.] One liter of the wash solution was obtained by mixing 300 ml of methanol and 728 ml of aqueous 0.10M $Na_2Co_3$. The pulse column conditions were: 60° C. temperature of operation, frequency was 20 cycles/minute, pulse height was 2.3 cm, aqueous flow was 9.7 ml/minute, and organic flow was 14.7 ml/minute. Five passes for the organic phase were made through the minicolumn (1.5 theoretical stages/pass) in contact with the carbonate-methanol wash followed by one pass for a water rinse. A pronounced improvement in extraction solution quality was obtained by use of the invention wash solution as compared with extraction solution cleaned by use of other presently-used washes. The following table presents the test results:

TABLE I

| Test | Solvent Before Wash | After Regular Carbonate Wash | Solution Invention After Wash Treatment |
|---|---|---|---|
| Color | Yellow | Yellow | Light Straw |
| Meniscus[1] | Intermediate | Flat | Concave |
| Disengagement | 1 min. 33 sec. | 43 sec. | 46 sec. |
| Complexants | 975 ppm | 38 ppm | 1 ppm |

NOTE:
[1]Concave indicates that no catonic surfactants are present; flat indicates that excessive surfactants are present.

The volume percentage of tributyl phosphate in the first cycle extraction solution was 30.78 before contact with the invention wash solution and was 30.79 after reported contact with the invention wash solution—there was no loss of tributyl phosphate, even with repeated contact with the invention wash solution.

EXAMPLE 3

To determine the extent of tributyl phosphate dissolution in the wash solution during washes, individual samples of fresh, virgin extraction solution (to be used in the first cycle of the Purex process) were contacted with various mixtures of methanol and water. After shaking in a separatory funnel (60-second shakes, one contact, room temperature, phase ratio equal to 1) each extraction solution phase was analyzed for the volume percent of tributyl phosphate (TBP). The following table presents the test results:

TABLE II

| Volume Percentage of Methanol (balance water) | Volume Percentage of TP (after contact) |
|---|---|
| Starting Extraction Soln. | 29.52 |
| 10 | 29.37 |
| 20 | 29.29 |
| 30 | 29.33 |
| 40 | 29.15 |
| 50 | 29.00 |
| 60 | 27.36 |

Wash solutions containing up to 50 volume percent of methanol can be contacted with solvent extraction solutions containing 30 volume percentage of tributyl phosphate and the reminder normal paraffin hydrocarbon without any appreciable loss of tributyl phosphate. Higher levels of methanol result in significant losses of tributyl phosphate. The use of 70% $MeO/H_2O$ at 60° C. almost instantaneously clears up and cleans up the solvent extraction solution in one contact with no third-phase formation. However, the use of 70% MeOH/-H2O results in a high loss of tributyl phosphate to the bottom phase.

EXAMPLE 4

Ten ml of a filtered solvent extraction solution from a typical Purex "hot-operation" plant was stirred in a Teflon beaker with an equal volume of 70 volume percentage of methanol (i.e., 7 ml methanol plus water to a volume of 10 ml) on a stirring hot plate until a temperature of 60° C. was reached. The solvent extraction solution contained radioactive material and was composed of 30 volume percent of tributyl phosphate extractant in a n-paraffin hydrocarbon diluent and had previously received full prior art cleanup with carbonate. The material was transferred to a separatory funnel. (Heating avoids third-phase formation which sometimes occurs when degraded solvent samples are contacted at room temperature with washes containing 70 volume percent of methanol.) The aqueous phase, containing all of the yellow color, was drained away. The clear organic phase was analyzed. The following table presents the test results:

TABLE III

| Analysis | Before Contact | After Contact | Percent Removed |
|---|---|---|---|
| Color | yellow | water white | |
| D-test (disengagement time) | 2 min., 12 sec. | 23 sec. | |
| M-test (meniscus) | intermediate | concave | |
| TBP volume percent | 29.45 | 21.88 | |
| γcpm/mL (SCA) | 64847 | 23266 | 64.12 |
| Ru-103-106, uCi/mL | 0.07454 | 0.02751 | 63.09 |
| Zr-95, uCi/mL | 0.00110 | 0.00045 | 58.94 |
| Nb-95, uCi/mL | 0.00100 | 0.00012 | 88.46 |

The loss of tributyl phosphate with only one contact of the wash solution (70 volume percent of methanol) was excessive, but as shown in Table II this loss can be remedied by using lower concentrations of methanol.

EXAMPLE 5

To avoid the loss of tributyl phosphate as occurred in Example 4, runs using the identical test solvent were made with 30 volume percent, 40 volume percent and 50 volume percent of methanol, wherein the losses of tributyl phosphate were found to be more acceptable. For the five runs in this example, the procedure of Example 4 was repeated except that five contacts (O/A = 1) instead of one contact were used. The following table presents the test results:

TABLE IV

| Run No. | Volume NeOH | Remainder of Solution | Temperature | Percent Total Gamma Removed |
|---|---|---|---|---|
| 1 | 30 | 0.10 M $Na_2CO_3$ | ambient | 12.40 |
| 2 | 40 | 0.10 M $Na_2CO_3$ | ambient | 17.75 |
| 3 | 50 | 0.25 M $Na_2CO_3$ | ambient | 18.14 |
| 4 | 50 | 0.25 M $Na_2CO_3$ | 60° C. | 29.79 |
| 5 | 40 | 0.25 M $Na_2CO_3$ | 60° C. | 22.48 |

In the above table, note that the extent of gamma removed even though such test solvent, from a typical "hot-operation" Purex plant, had previously received an exhaustive pre-cleaning with conventional carbonate washes.

Other analytical tests have shown good cleanup of the Purex extraction solution by the invention wash solution with minimum loss of tributyl phosphate during the cleanup. The usual loss of tributyl phosphate was a lowering of its content from 30 volume percent to 28 or 29 volume percent. Thus, there must be some trade-off of tributyl phosphate retention when complete removal of all of the impurities is desired. There are, however, some indications that the lost tributyl phosphate may be that portion which has received some damage and is thus flawed.

By way of summary, the invention involves combining methanol with an aqueous solution of inorganic salts to form a contact wash solution for removing impurities present in the Purex process extraction solution. Dilute carbonate washes are desirable additives at low methanol concentrations, otherwise emulsion problems may be encountered. The performance of the invention wash is improved by operation at a temperature of 60° C. (preferred temperature). All of the invention washes should be followed by water rinse to remove traces of methanol and sodium soaps (formed by the carbonate) that may be present. Carbonate prewashes are not required for solvents cleaned by contact with the inventive wash. The invention wash removes the same solvent degradation products that are removable by solid sorbers, but removes them more quickly, more efficiently and for a longer time. The methanol (b.p. =65° C.), used for the invention wash, can be recycled by distillation. In laboratory tests, the distillate was 83 volume percent $MeOH/H_2O$, as determined by density measurements. This was used for preparation of the invention wash and found to be satisfactory for cleanup of the solvent extraction solutions.

The foregoing description of preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. Process for removing diluent degradation products from a solvent extraction solution comprising an admixture of an organic extractant for uranium and plutonium and a non-polar organic liquid diluent, which has been used to recover uranium and plutonium from spent nuclear fuel, comprising:

combining a wash solution comprising:

(a) water; and (b) a positive amount up to about, and including, 50 volume percent of at least one highly-polar water-miscible organic solvent, based on the total volume of said water and said highly-polar organic solvent, with said solvent extraction solution after uranium and plutonium values have been stripped from the solvent extraction solution, said diluent degradation products dissolving in said highly-polar organic solvent and said extractant and diluent of said extraction solution not dissolving in said highly-polar organic solvent, and separating said highly-polar organic solvent and said extraction solution to obtain a purified extraction solution.

2. Process as claimed in claim 1 wherein said highly-polar organic solvent is ethanol.

3. Process as claimed in claim 1 wherein said highly-polar organic solvent is methanol.

4. Process as claimed in claim 3 wherein said highly-polar organic solvent is separated from said extraction solution by decanting off said highly-polar organic solvent.

5. Process as claimed in claim 3 wherein said combining step is conducted at a temperature above room temperature.

6. Process as claimed in claim 3 wherein said combining step is conducted at a temperature between 55° and 65° C.

7. Process as claimed in claim 3 wherein said wash solution and said solvent extraction solution are combined in a miniature pulse column.

8. Process as claimed in claim 7 wherein said combination is done continuously and in counterflow.

9. Process as claimed in claim 3 wherein a positive amount up to about 40 volume percent of said methanol, based on the total volume of said water and said methanol, is present in said wash solution.

10. Process as claimed in claim 3 wherein said solvent extraction solution is a solution of tributyl phosphate, in a paraffin hydrogen diluent, said solution initially containing diluent degradation products.

11. Process as claimed in claim 3 wherein said wash solution also contains at least one inorganic salt.

12. Process as claimed in claim 11 wherein said inorganic salt is $Na_2CO_3$.

13. Process as claimed in claim 11 wherein up to about 0.5M of said inorganic salt, based on said water, is present.

14. Process as claimed in claim 3 wherein the purified solvent extraction solution is returned to be reused in circulation.

* * * * *